Feb. 23, 1937.  G. T. RANDOL  2,071,359
TRANSMISSION CONTROL MECHANISM FOR MOTOR VEHICLES
Filed Aug. 12, 1935  9 Sheets-Sheet 9
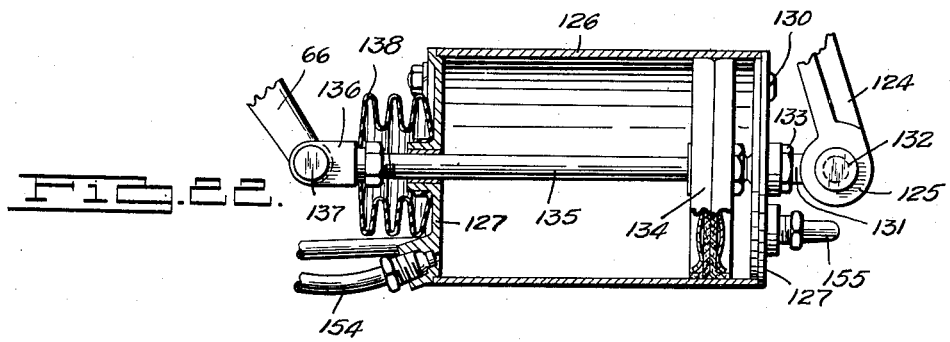
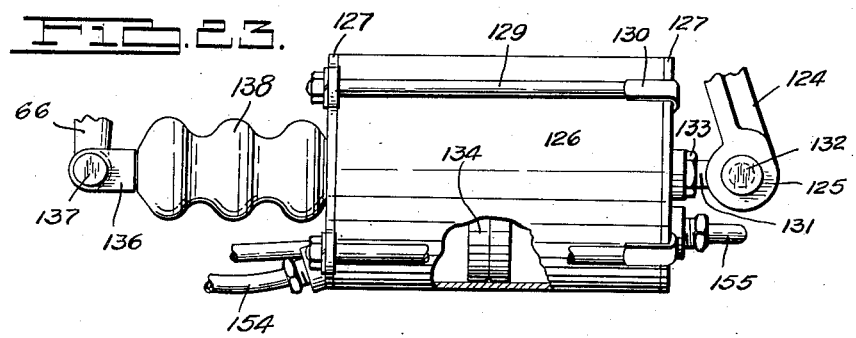
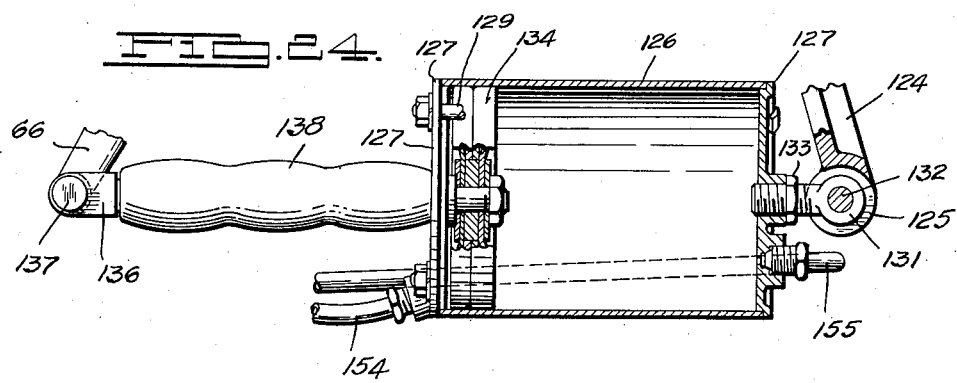
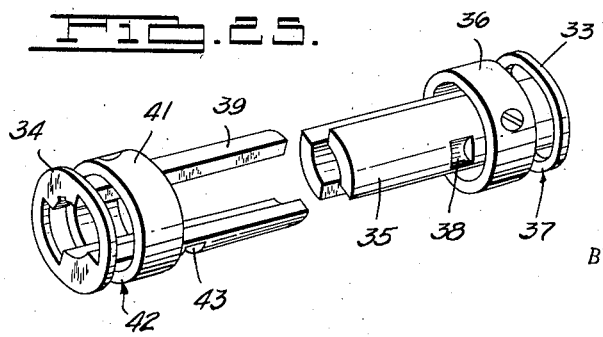
INVENTOR.
G. T. Randol
BY Thos. H. Johnston
ATTORNEY Patented Feb. 23, 1937

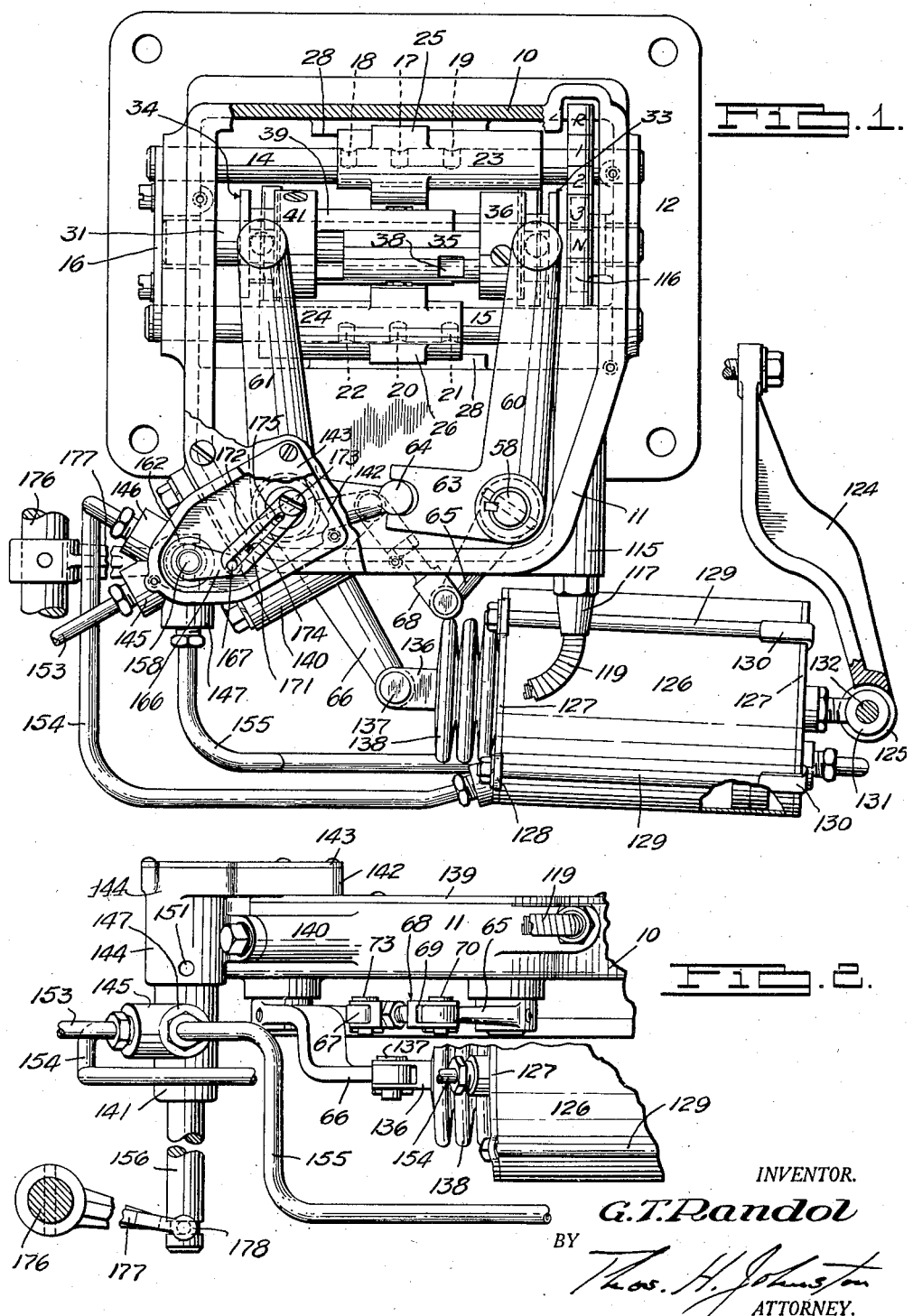

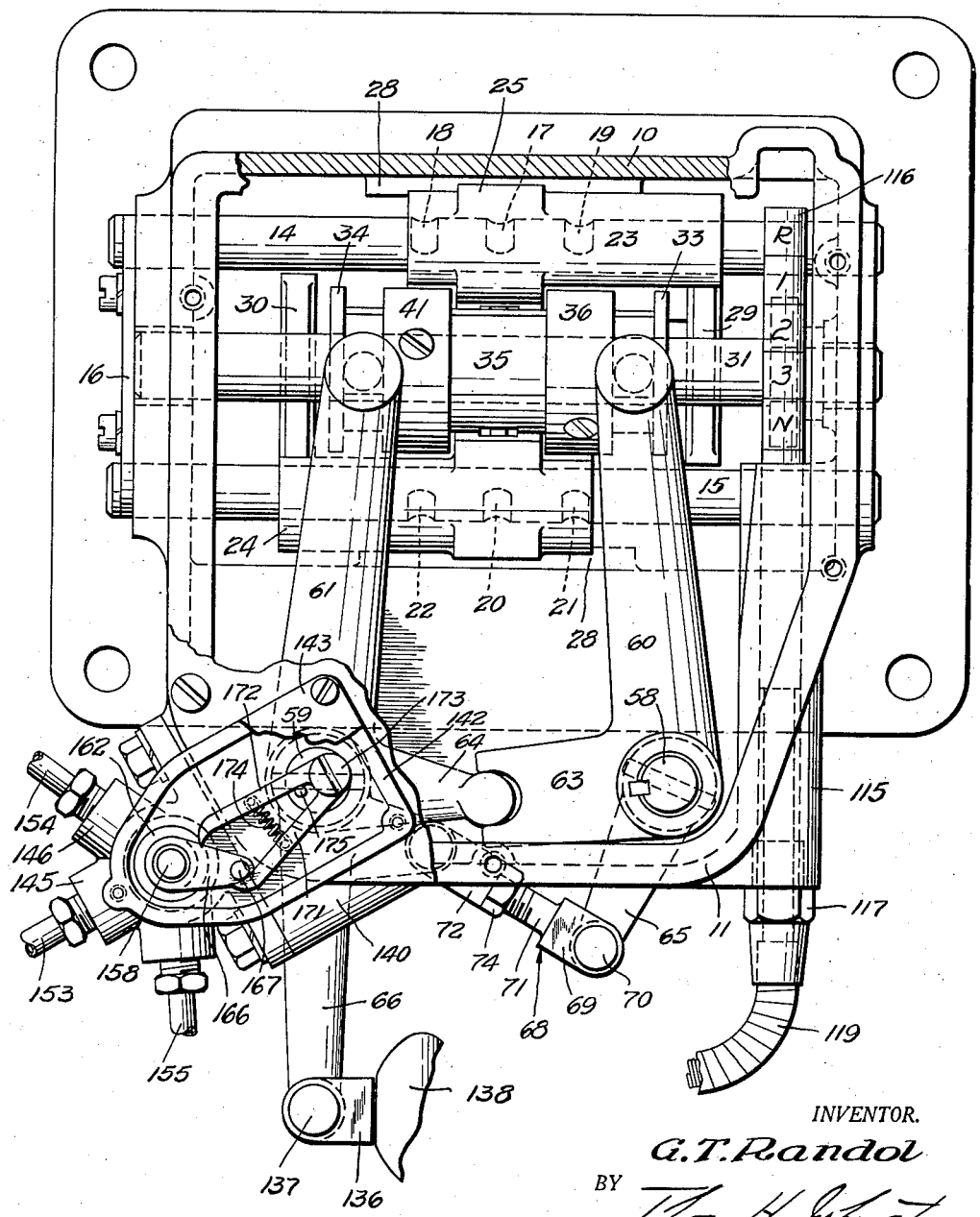

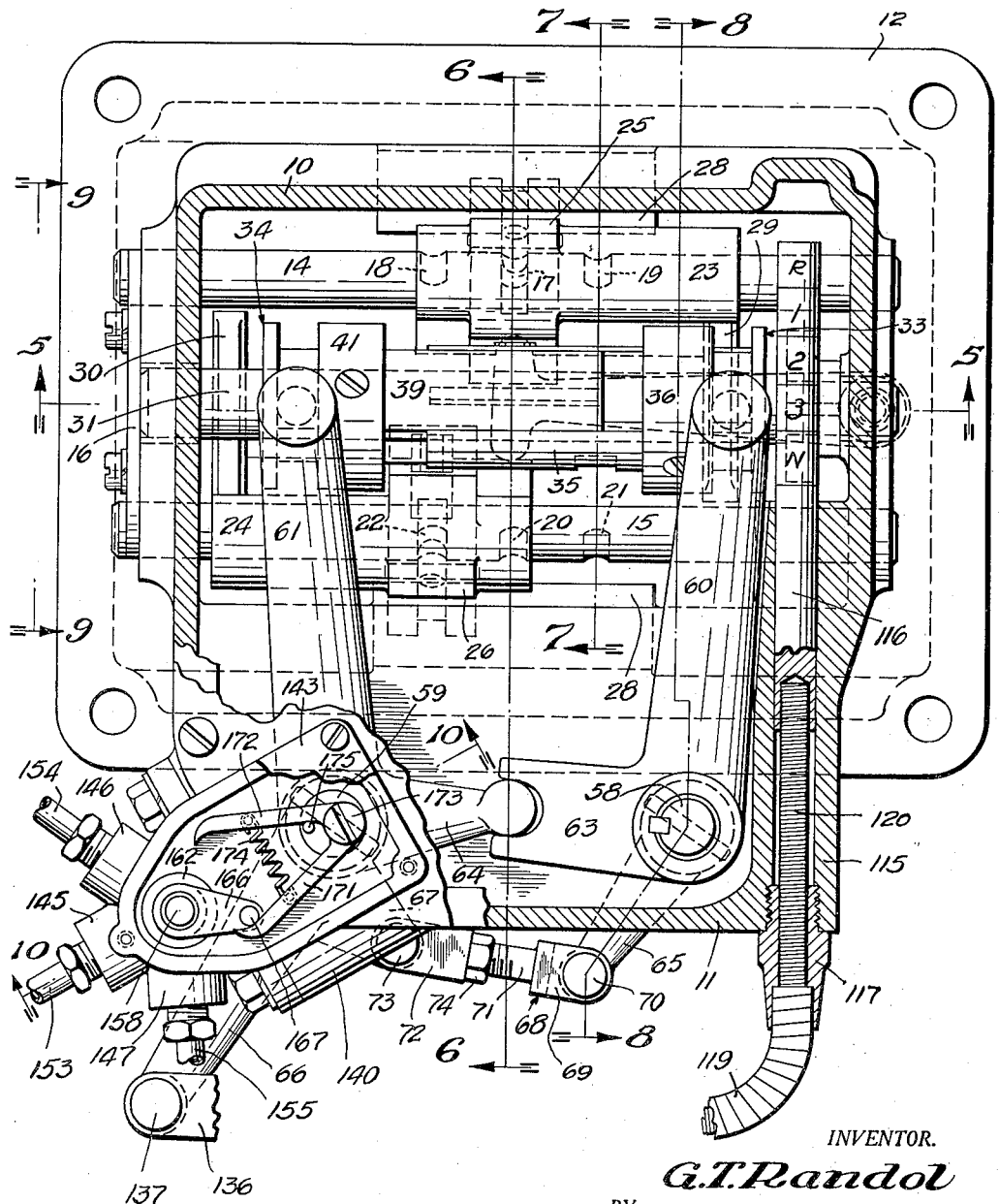

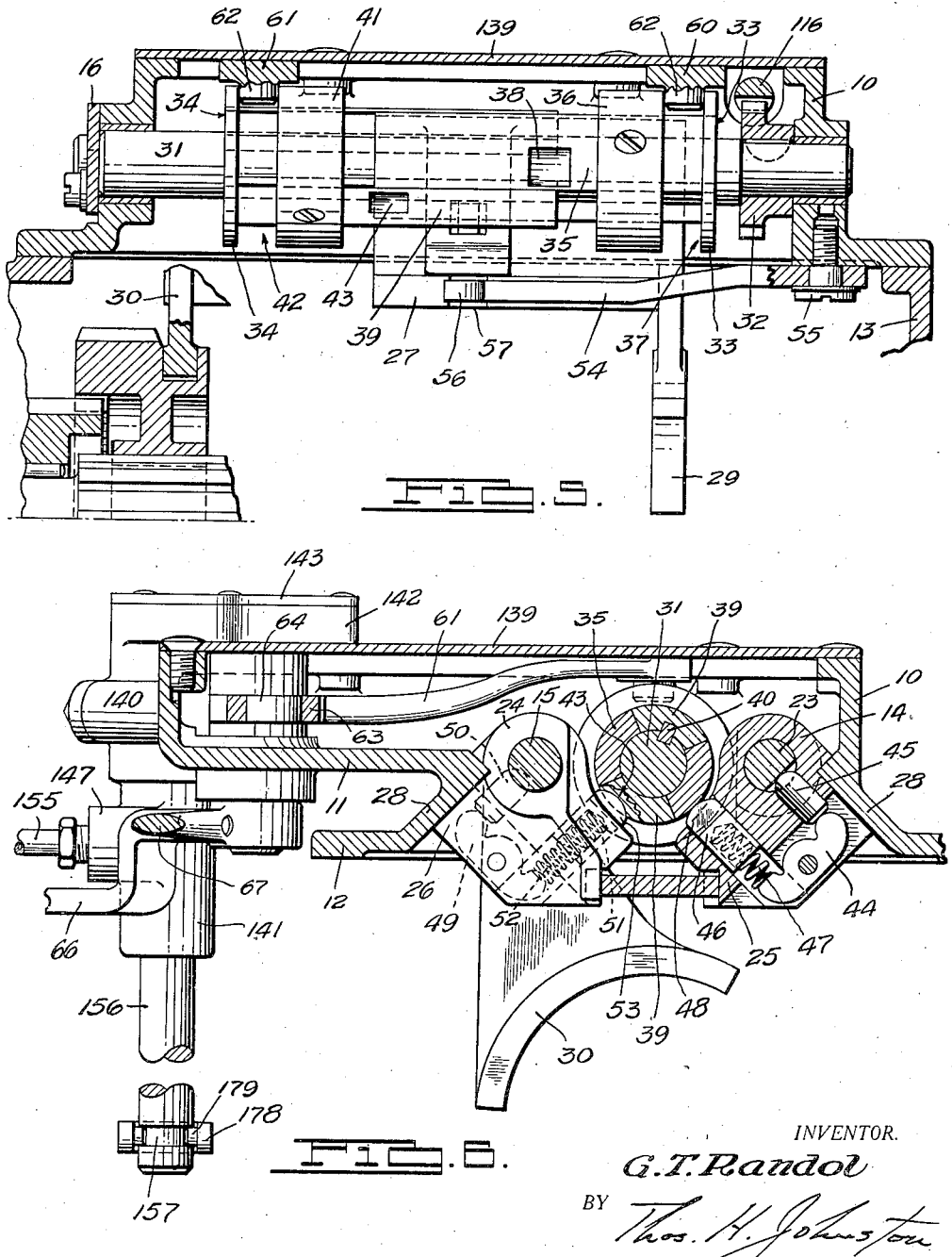

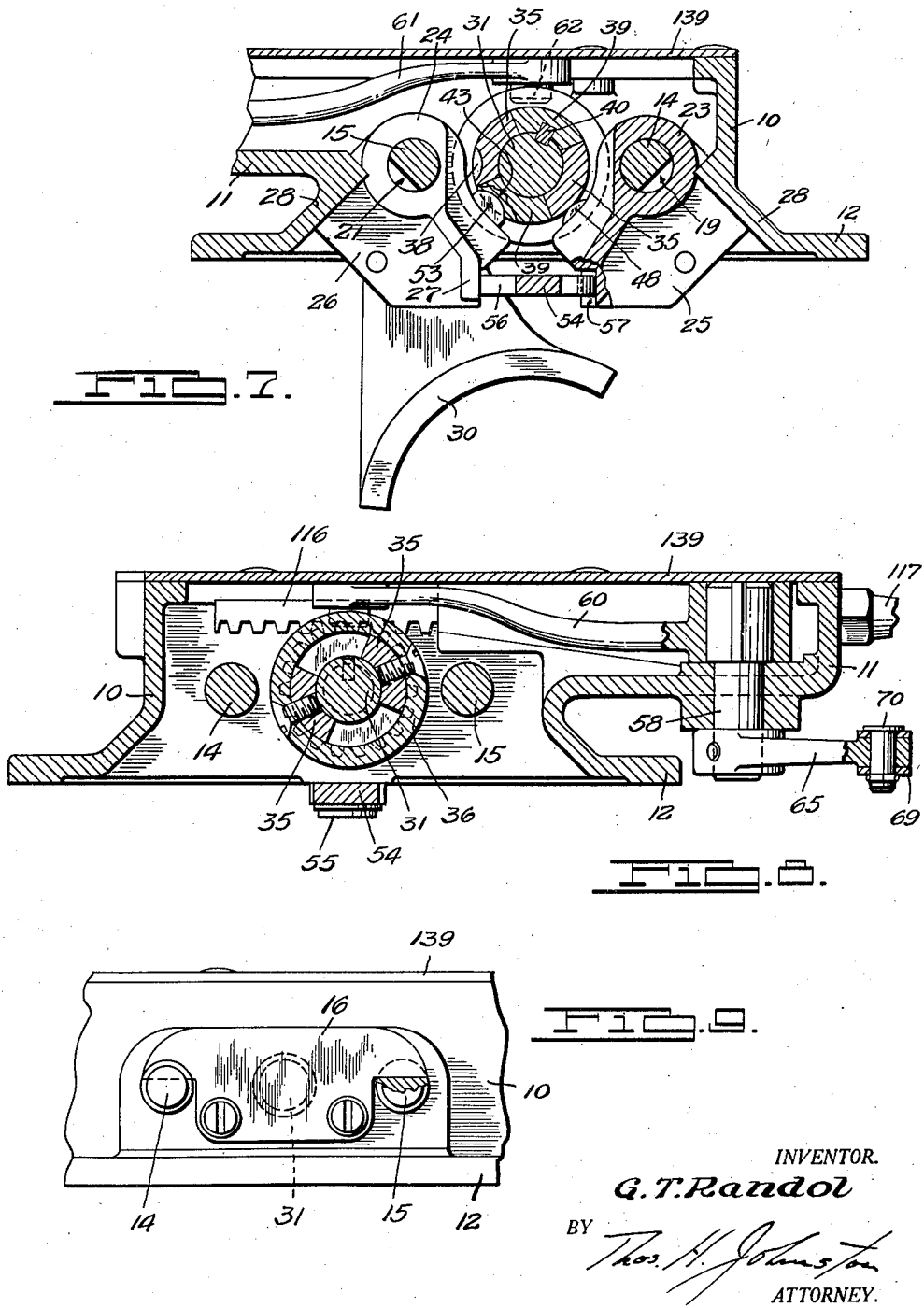

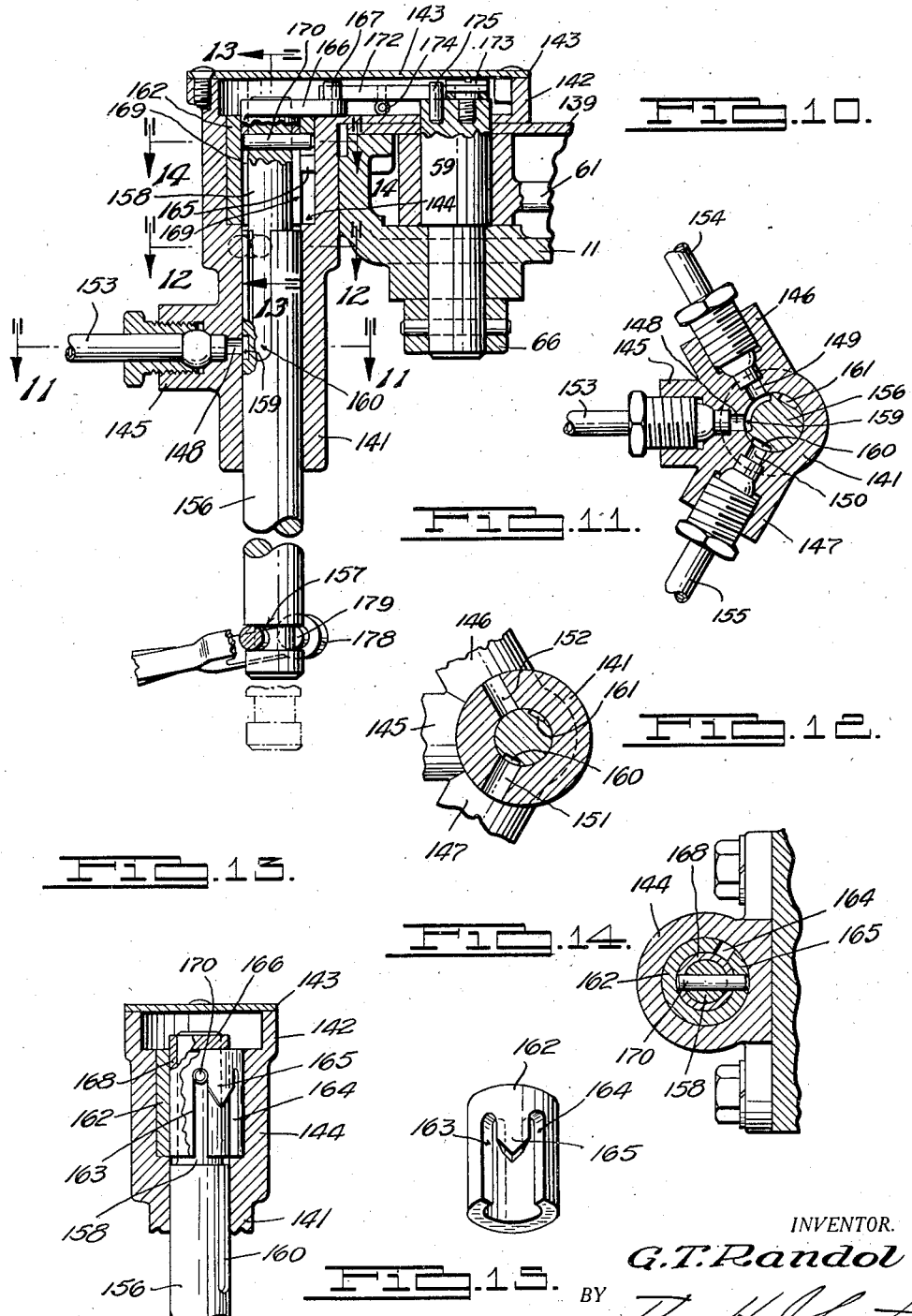

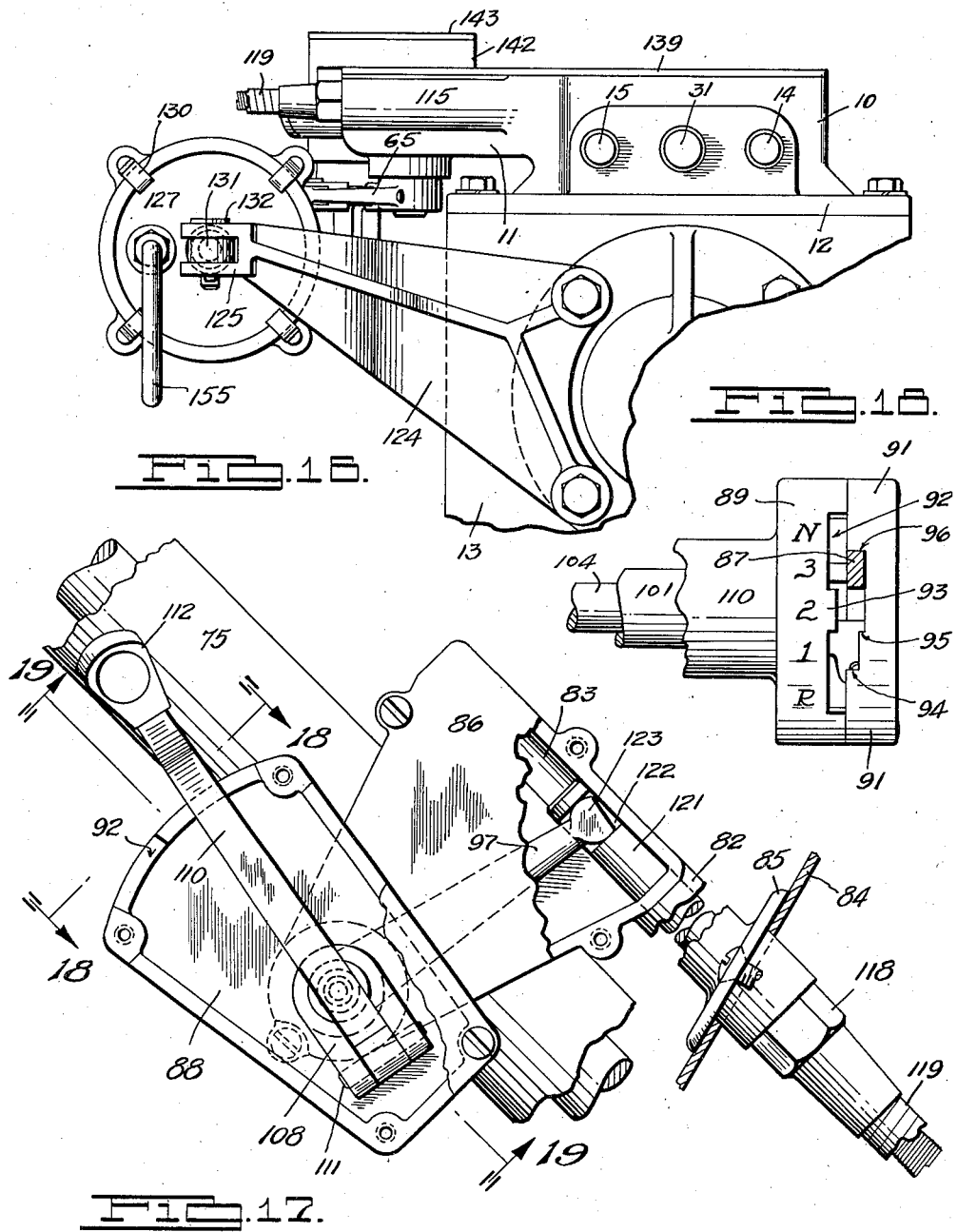

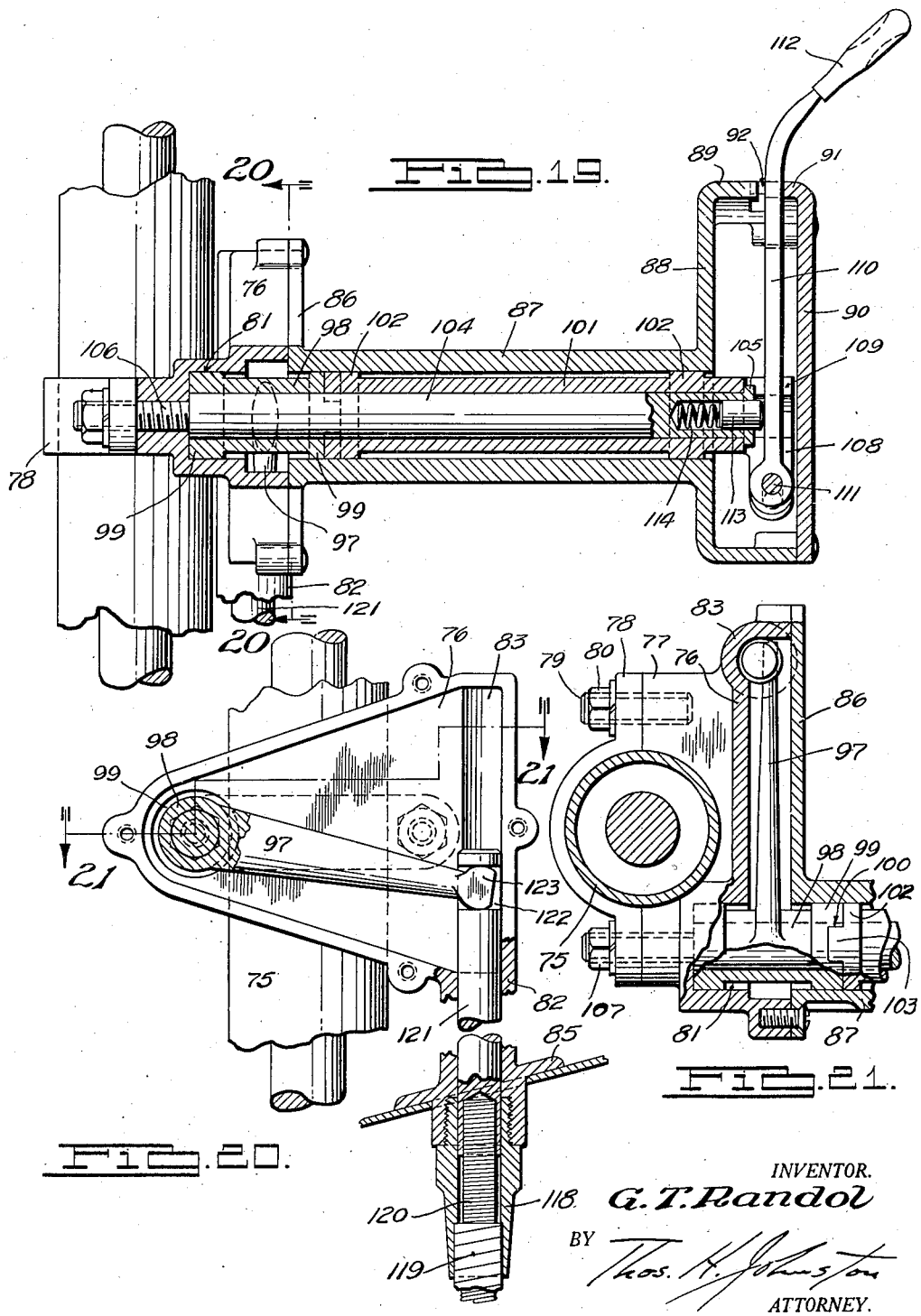

2,071,359

UNITED STATES PATENT OFFICE 2,071,359

TRANSMISSION CONTROL MECHANISM FOR MOTOR VEHICLES

Glenn T. Randol, Marmaduke, Ark.

Application August 12, 1935, Serial No. 35,891

21 Claims. (Cl. 74—334)

This invention relates to an improved transmission control mechanism for motor vehicles and seeks, among other objects, to provide a mechanism admitting of unrestricted preselection whereby pre-selection may be progressive if so desired.

A further object of the invention is to provide a mechanism wherein the pre-selections will be positively made through the medium of a hand control lever, wherein said lever will be sensitive and accessible to the fingers of the driver without removing the hands from the steering wheel, so that changes in speed may be made with certainty without taking the eyes from the road, and wherein, when a selection is made, the driver will be able to tell by the touch of the fingers that the object sought has been accomplished.

Another object of the invention is to provide a hand control wherein, when the hand lever is shifted in one direction, a positive position of the lever will be provided for low, high and neutral respectively, while, when the lever is shifted in the opposite direction, a positive position of the lever will be provided for high, second, low and reverse respectively, so that, in city driving which requires frequent shifts from high to second and back again, the lever may be operated with entire certainty.

A further object of the invention is to provide a mechanism wherein the hand control may be readily installed either as standard equipment or as an accessory, wherein the indicated positions of the hand lever for the different speeds and neutral will remain true and wherein compensation will be made within reasonable limits for any lost motion which may develop so that when the hand lever is set to select any given speed or neutral, the mechanism will always function to select said speed or neutral as the case may be.

Another object of the invention is to provide a mechanism employing a power operated piston for shifting the speed gears of the transmission and wherein the piston will be operative, upon each throw thereof, to neutralize a previously active speed and render a selected speed active, in the event a future speed has been selected.

Still another object of the invention is to provide a mechanism embodying a toggle adapted to convert each one-way throw of the piston into a two-way movement of the gear shifters for first neutralizing an active speed and then rendering a selected speed active, wherein as the toggle crosses dead center the parts will be permitted to pause momentarily so that the usual synchronizing mechanism of the transmission may effectively function before the gear being shifted is moved into mesh wherein the toggle will be smooth in operation and wherein the toggle may be adjusted to compensate for wear or to accommodate the sliding gear travel of different transmissions.

A further object of the invention is to provide an improved valve for controlling the power piston wherein the valve will be opened and closed by the clutch pedal of the vehicle and wherein, upon each throw of the piston the valve will be automatically set to cause reverse travel of the piston when next actuated.

And the invention seeks as a still further object, to provide a mechanism wherein the valve and piston will always remain synchronized.

Other and incidental objects of the invention not specifically mentioned in the foregoing will appear during the course of the following description and in the drawings forming part of this application, Figure 1 is a plan view showing my improved mechanism in neutral, parts being broken away.

Figure 2 is a fragmentary elevation particularly showing the control valve.

Figure 3 is an enlarged plan view showing the selectors moved to the limit of their inward throw and high speed selected.

Figure 4 is a plan view similar to Figure 3 but showing high speed active, parts being illustrated in section.

Figure 5 is a vertical longitudinal sectional view on the line 5—5 of Figure 4.

Figure 6 is a transverse sectional view on the line 6—6 of Figure 4.

Figure 7 is a detail transverse sectional view on the line 7—7 of Figure 4.

Figure 8 is a transverse sectional view on the line 8—8 of Figure 4.

Figure 9 is a fragmentary elevation of the front end of the casing as seen from the line 9—9 of Figure 4.

Figure 10 is a detail vertical sectional view on the line 10—10 of Figure 4 particularly showing the control valve.

Figure 11 is a detail sectional view on the line 11—11 of Figure 10.

Figure 12 is a detail sectional view on the line 12—12 of Figure 10.

Figure 13 is a detail vertical sectional view on the line 13—13 of Figure 10.

Figure 14 is a detail sectional view on the line 14—14 of Figure 10.

Figure 15 is a detail perspective view of the locking sleeve for the valve rod.

Figure 16 is a fragmentary rear elevation particularly showing the bracket which supports the vacuum cylinder.

Figure 17 is a fragmentary elevation particularly showing the hand lever and associated mechanism in high speed position, parts being broken away.

Figure 18 is a fragmentary plan view of the control slot for the hand lever as seen from the line 18—18 of Figure 17.

Figure 19 is a sectional view on the line 19—19 of Figure 17 showing the shaft of the control lever and associated parts.

Figure 20 is a section on the line 20—20 of Figure 19.

Figure 21 is a section on the line 21—21 of Figure 20.

Figure 22 is a detail section of the power cylinder and showing the power piston at the end of its rearward throw, as in Figure 1 of the drawings.

Figure 23 is a detail elevation of the power cylinder, partly broken away to show the piston midway of its forward throw as in Figure 3 of the drawings.

Figure 24 is a detail section of the power cylinder showing the power piston at the end of its forward throw, as in Figure 4 of the drawings.

Figure 25 is a detail perspective view particularly showing the selectors.

In carrying the invention into effect, I employ a casing 10 which, as seen in Figure 6, is provided at the left side thereof with a reduced extension 11 and in this connection, it may be noted that the arrows of the section line 6—6 of Figure 4 point toward the front end of the casing and the terms right and left as used herein will be predicated accordingly. Formed on the casing at its lower side is a bottom flange 12 which, as seen in Figures 5 and 16, is shaped to fit over a conventional transmission case, as conventionally shown at 13, supplanting the usual transmission case cover and, as will be observed, the flange 12 is apertured to receive the usual bolts which ordinarily secure the transmission case cover so that, as will be appreciated, the casing 10 may be readily mounted in operative position.

Inserted through the front end wall of the casing is a pair of parallel removable rods 14 and 15 which, as shown in Figure 9, are slotted at their forward ends and screwed to said end wall of the casing is a locking plate 16 provided at its ends with lugs engaging in the slots of the rods for locking the rods against rotation as well as against endwise movement. Formed in the lower side of the rod 14 medially thereof, as best seen in dotted lines in Figure 3, is a neutral notch 17, a low speed notch 18 and a reverse notch 19. The rod 15 is similarly provided with a neutral notch 20, a second speed notch 21 and a high speed notch 22.

Slidable on the rods 14 and 15 are gear shifters 23 and 24. Near opposite ends thereof, these shifters are, as particularly seen in Figures 5, 6 and 7 of the drawings, provided with thickened bosses which form heads, the head of the shifter 23 being indicated at 25 and the head of the shifter 24 being indicated at 26, and formed on the shifters at their lower margins are parallel vertical flanges 27. It is now to be observed, as particularly seen in Figures 4 and 6 of the drawings, that the side walls of the casing 10 are provided medially with inclined portions which form longitudinal abutments 28 each having angularly disposed inner faces and, as best brought out in Figure 6, the heads 25 and 26 of the shifters are cut away to provide seats fitting the angularly disposed faces of the abutments to rest flat thereagainst. The abutments will thus limit the shifters against rotative movement on the rods 14 and 15 and are of a length equal to the endwise travel of the shifters to coact with said rods for slidably supporting the shifters for endwise movement in the casing 10. Depending from the rear end of the shifter 23, as seen in Figure 3, is a fork 29 and depending from the forward end of the shifter 24 is a fork 30, these forks extending into the transmission case, as suggested in Figure 5, to operatively engage the proper sliding gears of the transmission and in this connection it should be observed that the gear engaged by the fork 29 is movable forwardly by the shifter 23 for low speed and rearwardly by said shifter for reverse while the gear engaged by the fork 30 is movable rearwardly by the shifter 24 for second speed and forwardly by said shifter for high speed.

Rotatable in suitable bearings in the front and rear end walls of the casing is a rotatable selector shaft 31 which lies midway between the rods 14 and 15 parallel thereto and is limited against forward displacement by the plate 16. At its rear end portion, the shaft is reduced and fixed thereon, as particularly seen in Figure 5, is a gear 32. Slidably fitting said shaft is a pair of companion selectors 33 and 34, shown in detail in Figure 25 of the drawings. As will be observed, the selector 33 includes a pair of sector-shaped fingers 35 integrally connected by an end-ring or head at the outer end of the selector and screwed to said fingers or otherwise detachably connected thereto is a collar 36 cooperating with said end-ring to provide an intervening annular groove 37 adjacent the outer end of the selector. Formed in one of the fingers 35 adjacent the collar 36 is a socket 38. The selector 34 is substantially a counterpart of the selector 33 and includes a pair of sector-shaped fingers 39 which, as seen in Figure 6 of the drawings, interengage with the fingers 35 of the selector 33 about the shaft 31 so that the several fingers provide a cylindrical surface around the shaft and formed in one of the fingers 39 is a suitable keyway to receive a key 40 locking the selector 34 to turn with the shaft 31. Thus, as the fingers 39 interengage with the fingers 35 of the selector 33, both selectors are locked to turn with the shaft. The fingers 39, like the fingers 35, are integrally connected at their outer ends by an end-ring or head and screwed or otherwise detachably connected to the fingers 39 is a collar 41 cooperating with said end-ring to provide an annular groove 42 around the selector near the outer end thereof. Formed in one of the fingers 39 adjacent the collar 41 is a socket 43 like the socket 38.

As shown in Figure 6, the head 25 of the shifter 23 is slotted at its lower side and pivoted in said slot is a rocker 44. Engaged by the upper end of the rocker is a detent 45 slidable through the upper portion of the head to coact with the rod 14 and slidable through a square opening in the lower portion of the head is a square plunger 46, the plunger being thus locked against rotation. Interposed between the lower end of the rocker 44 and said plunger is a spring 47 one end of which is accommodated in a suitable socket in the plunger and, as will be noted, the plunger is formed at its outer end with a reduced tip 48 of a thickness somewhat less than the width of the sockets 38 and 43 of the selectors to provide corresponding play between the parts. The head 26 of the shifter 24 is likewise provided with a rocker, detent, plunger and spring identical with the corresponding parts of the shifter 23 and mounted in like manner, the rocker of the shifter 24 being indicated at 49, the detent at 50, the plunger at 51, the plunger spring at 52 and the plunger tip at 53. As shown in Figure 25, the end walls of the sockets 38 and 43 are flat to engage the flat side faces of the plunger tips 48 and 53 while the bottom walls of said sockets are concave, the tips of the plungers being provided with convex end faces so as to seat flat against the bottom walls of the sockets. This construction provides an arrangement whereby, when the selectors are shifted, as will be presently described, the plunger tips will each, when engaged in either of the sockets 38 or 43, serve to effectually couple the corresponding gear shifter with either one or the other of said selectors, as the case may be while, when the selectors are rotated, the plunger tips will readily ride out of said sockets.

As will be seen, the springs 47 and 52 will yieldably urge the detents 45 and 50 to coact with the rods 14 and 15 and will also yieldably urge the plungers 46 and 51 to coact with the selectors. When either of the plungers is not engaged in one of the sockets 38 and 43 of the selectors, both of the plungers will thus ride against the cylindrical surface formed by the selector fingers and, in this connection, attention is directed to the fact that when the selectors are shifted outwardly away from each other to normal retracted position, as seen in Figure 1, the fingers 35 and 39 of the selectors will still provide such cylindrical surface to coact with the plungers so that at no time will the plungers ride off of said fingers to become displaced by the springs 47 and 51. When the selectors are shifted inwardly towards each other to the end of their throw, as shown in Figure 3, it will be noted that the selector fingers 35 and 39 do not project beyond the outer ends of the selectors. In thus forming the selectors with interengaging fingers, ample endwise travel of the selectors is possible while, at the same time, the construction is compact. Furthermore, it will be noted that when the selectors are shifted inwardly, the sockets 8 and 43 of the corresponding selector fingers are brought into circular alignment to selectively receive the plungers 46 and 51 but particular attention is directed to the fact that the sockets are staggered circumferentially of said fingers with respect to the position of the plungers so that only a single socket can, at any one time, be moved into a position to receive one or the other of said plungers. It is thus possible for only a single plunger to function at any one time for coupling either one or the other of the shifters, as the case may be, with one of the selectors.

Pivoted at its outer end to the rear end wall of the casing 10, as seen in Figure 5, is an interlock lever 54 detachably mounted by a cap screw 55 in a plane midway between the gear shifters 23 and 24. At its inner end this lever is, as seen in Figures 4 and 7, provided with a T-head 56 and formed in the parallel vertical flanges 27 of the gear shifters are sockets 57 which, when said shifters are centralized within the casing in neutral position, are disposed opposite each other in alignment with the T-head 56. The head is, as will be noted, of a length greater than the distance between said flanges so that when either gear shifter is moved from neutral position, the socket in the flange 27 thereof will coact with the adjacent end of the head for rocking the lever and engaging the other end of the head in the socket of the flange of the other gear shifter, when the head will be confined between said flanges. Accordingly, as will be seen, the construction provides a means for automatically locking either gear shifter in neutral position as the other shifter is moved so that by no possibility can both shifters be moved at the same time to render more than one speed active.

Journaled through a suitable bearing in the bottom wall of the extension 11 of the casing 10, as particularly shown in Figure 8, is a vertically disposed shaft 58 opposite which is similarly mounted, as seen in Figure 10, a parallel vertically disposed shaft 59. Keyed to the upper end of the shaft 58 is a selector lever 60 and freely mounted upon the upper end of the shaft 59 is a coacting selector lever 61. As brought out in Figure 5, the free ends of these levers extend over the selectors 33 and 34 and depending from said levers are studs 62 freely engaging in the annular grooves 37 and 42 of the selectors. Thus, when the levers are swung inwardly towards each other, the selectors will be moved inwardly to the end of their throw, as shown in Figure 3, while, when the levers are swung apart, the selectors will be shifted outwardly to normal retracted position, as shown in Figures 1 and 4 of the drawings. Extending laterally from the hub of the lever 60 is an arm 63 notched at its free end and extending laterally from the hub of the lever 61 is an arm 64 rounded at its free end to engage in said notch so that the levers are thus coupled to swing in unison.

Pinned to the lower end of the shaft 58 is a toggle lever 65 and pinned to the lower end of the shaft 59 is an offset operating lever 66 from the inner end of which extends a short angularly disposed integral toggle lever 67. Connecting the levers 65 and 67 is a link indicated for convenience as a whole at 68. This link is formed of complemental sections one of which is provided with a yoke 69 which is pivotally connected to the free end of the lever 65 by a pin 70 and extending from said yoke is a shank 71. The other section of the link comprises a yoke 72 which straddles the free end of the lever 67 and pivotally connecting said yoke to the lever is a pin 73. The yoke 72 is screwed on the shank 71 for adjustment thereon for varying the length of the link 68 and thus varying the throw of the levers 60 and 61 to compensate for wear or to suit the sliding gear travel of different transmissions and locking the yoke in adjusted position is a jam-nut 74.

The free ends of the levers 60 and 61 normally stand apart, as shown in Figure 1, and this figure of the drawings also shows the toggle ready to function. As will be observed, the operating lever 66 stands at the end of its rearward throw while the toggle link 68 stands at an acute angle to the lever 65 and it will now be assumed that the lever 66 is swung forwardly. As will be perceived, the lever 67 will thus be initially caused to travel in an arc towards the pin 70 so that the link will in turn be caused to push on the lever 65 for swinging the levers 60 and 61 towards each other, as shown in Figure 3, to the limit of their inward throw, it being recalled in this connection that the levers 60 and 61 are coupled to swing in unison. Thus, the selectors 33 and 34 will be coincidently shifted inwardly by the levers 60 and 61 to the limit of their inward movement. As will be observed, the lever 66 has, in the position of the parts shown in Figure 3, traveled forwardly for approximately half of its throw while the pin 73 stands approximately in line with the shaft 59 and pin 70. Further forward movement of the lever 66 from the position shown in Figure 3 to the end of its throw will thus cause the pin 73 to cross over the pivotal center thereof, when the link 68 will be caused to pull on the lever 65 for swinging the levers apart to normal position, as shown in Figure 4, and returning the selectors 33 and 34 to their original normal position at the end of their outward throw. Thus, the one-way forward movement of the lever 66 is converted by the toggle into a two-way movement of the levers 60 and 61 for first shifting the selectors 33 and 34 inwardly to the limit of their inward movement and then returning the selectors outwardly to normal position at the end of their outward throw.

Referring now to Figure 4 of the drawings, it will be assumed that the lever 66 is swung rearwardly. As will be seen, the toggle link 68 will, as just previously described, be first caused to push on the lever 65 for swinging the levers 60 and 61 inwardly to the position shown in Figure 3 and shifting the selectors 33 and 34 inwardly to the limit of their inward movement when, as the rearward movement of the lever 66 continues, the link 68 will be caused to pull on the lever 65 for swinging the levers 60 and 61 outwardly to the position shown in Figure 4 and returning the selectors outwardly to normal position at the end of their outward throw. Thus, the one-way rearward movement of the lever 66 is converted by the toggle into a two-way movement of the levers 60 and 61 for first shifting the selectors 33 and 34 inwardly to the limit of their inward movement and then returning the selectors outwardly to normal position at the end of their outward throw. As the toggle link crosses over dead center, incident to either the forward or rearward movement of the lever 66, the parts will, as will be seen, be permitted to pause momentarily so that the usual synchronizing mechanism will be permitted to function before a selected gear is shifted into mesh.

It will now be assumed that the selectors 33 and 34 stand in neutral position, as shown in Figure 1, and that the gear shifters 23 and 24 stand centralized within the casing in normal position. In this neutral position of the selectors the sockets 38 and 43 of the selectors are disposed laterally with respect to the position of the plungers 46 and 51 of the gear shifters 23 and 24 so that the plungers rest against the cylindrical surface provided by the selector fingers. Furthermore neither of the sockets 38 and 43 is disposed in line with either of the plungers so that should the lever 66 be operated either forwardly or backwardly, as the case may be, to cause the selectors to be shifted first inwardly and then outwardly, as previously described, the selector fingers will, as will be seen, merely slide inwardly and outwardly against the plungers with the result that the gear shifters will remain centralized within the casing in neutral position. It will now be assumed, however, that the selector shaft 31 is turned to rotatably set the selectors to select high speed. In this position of the selectors, the socket 43 of the selector 34 will be disposed in line with the plunger 53 of the gear shifter 24. Accordingly, when the lever 66 is then operated and the selectors are shifted inwardly to the position shown in Figure 3, as previously described, to dispose the sockets of the selectors in circular alignment, the tip 53 of the plunger 51 will, as shown in Figures 5 and 7 of the drawings, drop into the socket 43 for coupling the gear shifter 24 with said selector. Consequently, as the throw of the lever 66 is completed and the selectors are shifted apart to their original position, as previously described, the gear shifter 24 will, as shown in Figure 4, be carried forwardly by the selector 34 for rendering high speed active. In like manner, when the shaft 31 is turned to rotatably set the selectors to select low speed, the socket 43 of the selector 34 will be disposed in line with the plunger 46 of the gear shifter 23. Accordingly, when the lever 66 is then operated and the selectors are shifted first inwardly and then outwardly, as previously described, said plunger will engage in the socket 43 for coupling the gear shifter 23 with said selector so that the gear shifter 23 will be carried forwardly for rendering low speed active. When the shaft 31 is turned to rotatably set the selectors to select reverse, the socket 38 of the selector 33 will be disposed in line with the plunger 46 of the gear shifter 23 so that upon operation of the lever 66, the gear shifter 23 will, as will now be appreciated, be carried rearwardly by said selector for rendering reverse active. Similarly, when the shaft 31 is turned to rotatably set the selectors to select second speed, the socket 38 of the selector 33 will be disposed in line with the plunger 51 of the gear shifter 24. Consequently, when the lever 66 is then operated, the plunger 51 will engage in said socket for coupling the gear shifter 24 with the selector 33 so that said gear shifter will be carried rearwardly for rendering second speed active.

As will thus be seen in view of the foregoing, the selectors 33 and 34 may, by turning the shaft 31, be set to pre-select any speed desired, when, upon the actuation of the lever 66, the speed selected will be rendered active. In this connection, attention is directed to the fact that as long as the selectors 33 and 34 are permitted to remain in any set position for rendering a selected speed active, and one or the other of the plungers 46 and 51 is engaged in either of the sockets 38 and 43 of the selectors, as the case may be, said plunger will, when the lever 66 is then operated, remain engaged in said socket so that the speed active will, when the selectors are shifted inwardly, first be neutralized and then, when the selectors are shifted outwardly, be again rendered active. Accordingly, in the absence of any fresh setting of the selectors, any speed active will, should the lever 66 be operated at the time, be returned active.

It is now to be observed that when the gear shifter 24 is in a forward position and high speed is active, as shown in Figure 4, said shifter will, even though not coupled to the selector 34 by the plunger 51 when the lever 66 is actuated, nevertheless, be neutralized by the collar 41 of said selector, which collar will, as the selectors are moved inwardly, engage the head 26 of the shifter for moving the shifter to neutral position and neutralizing high speed. Similarly, the collar 41 of the selector 34 will, when the shifter 23 is free in forward position and low speed is active, engage the head 25 of said shifter for returning the shifter to neutral position and neutralizing low speed when the lever 66 is actuated. In like manner, the collar 36 of the selector 33 is adapted to engage the head 25 of the shifter 23 for moving said shifter to neutral position and neutralizing reverse and is also adapted to engage the head 26 of the shifter 24 for moving the latter shifter to neutral position and neutralizing second speed. Thus, provision is made whereby when any speed is active, the selectors may be rotatably set to select a future speed.

As will be seen, the selector shaft 31 may, while high speed is active, be rotatably set to select any other speed or neutral, the rotation of the selectors causing the plunger 51 to ride out of the socket 43 of the selector 34 onto the cylindrical surface provided by the selector fingers so that when the lever 66 is actuated, the collar 41 of said selector will engage the head 26 of the shifter 24 for returning said shifter to neutral position and neutralizing high speed. In the event the selectors have been set to select a future speed, as for instance low speed, the plunger 46 of the gear shifter 23 will, when the selectors are moved inwardly, engage in the socket 43 of the selector 34 so that as the throw of the lever 66 is completed, low speed will be rendered active. As will be appreciated, a like functioning of the parts will occur when any speed is active and a future speed is selected while, if, when any speed is active, the selectors are rotatably set to neutral, the speed active will, upon the actuation of the lever 66 be neutralized while, as previously described, no future speed will be selected so that the mechanism will be brought to rest in neutral. I accordingly provide a construction wherein the selection of the different speeds as well as neutral is unrestricted, wherein, while any speed is active, any other speed or neutral may be selected and consequently, wherein the different speeds may be selected progressively either in ascending or descending order, as may be desired.

When the gear shifter 23 is in neutral position, the detent 45 will, as shown in Figure 6, engage in the notch 17 of the rod 14 for holding said shifter against movement. Similarly, when low speed is active, the detent 45 will engage in the low speed notch 18 of said rod while, when reverse is active, the detent will engage in the notch 19 of the rod. The detent 50 serves a similar function for the gear shifter 24. In the neutral position of the gear shifter 24, the detent 50 will engage in the neutral notch 20 of the rod 15. When second speed is active, the detent will engage in the notch 21, while, when high speed is active, the detent will engage in the notch 22 for holding the gear shifter against movement. In this connection, attention is directed to Figure 6 of the drawings wherein it will be noted that when the selectors 33 and 34 are shifted inwardly and the plunger 46 drops into either of the sockets 38 and 43 of the selectors, the tension on the spring 47 will be correspondingly relieved with the result that the tension of said spring on the detent 45 will be likewise relieved to facilitate the movement of the gear shifter 23 for rendering a selected speed active. A like effect will, of course, occur in connection with the plunger 51. When the selectors are shifted inwardly and the plunger 51 drops into either of the sockets 38 and 43 of said selectors, the tension on the spring 52 will be relieved to correspondingly relieve the tension of said spring on the detent 50 to facilitate the movement of the gear shifter 24 for rendering a selected speed active. Conversely, when the plungers rest against the cylindrical surface provided by the selector fingers, however, the tension on the springs 47 and 51 will be increased so that the detents 45 and 50 will be held against the rods 14 and 15 with correspondingly increased force. Thus, when any speed is active and the selectors are rotatably set to select a future speed or neutral, the gear shifter thus freed from the selector with which it was previously coupled by its plunger, as previously described, will nevertheless, be effectually retained by its detent either in the forward or rearward position, as the case may be, for thus securely holding the speed active until the operating lever 66 is next actuated.

Referring now more particularly to Figures 17 to 20 inclusive of the drawings, the usual steering post of the vehicle is indicated at 75 and mounted upon said post close below the steering wheel is a more or less triangular shaped housing 76 which is provided at its rear side with a block 77 notched to fit the post. Mating with said block is a cap 78 and extending through the forward end of the cap is a stud 79 which receives a nut 80 detachably securing the cap at said end thereof. At the opposite end of the block, the housing is, as particularly seen in Figures 19 and 21, provided with an internal cylindrical socket 81 and formed on the forward wider end of the housing is a depending sleeve 82, the bottom wall of the housing being provided with an enlarged channel 83 aligning with the upper end of said sleeve. As shown in Figures 17 and 20, the sleeve 82 extends through the instrument panel of the vehicle, as conventionally shown at 84, and formed on said sleeve is a flange 85 detachably secured to the panel by suitable cap screws or the like.

Closing the housing 76 is a detachable cover plate 86 and formed on said plate is an elongated bearing sleeve 87 which extends laterally from the plate and is axially aligned with the socket 81. The sleeve 87 is of a length to extend adjacent the periphery of the steering wheel of the vehicle and formed on said sleeve at its outer end is a tapered casing 88 provided at its upper wider end with an end wall 89. Closing said casing is a cover plate 90 and formed on the upper end of said plate is an end flange 91 mating with the end wall 89 of the casing.

As particularly seen in Figure 18, the confronting edges of the end wall 89 of the casing 88 and flange 91 of the cover plate are notched to provide a slot 92 into which projects a lug 93 on the end wall 89 while at the side of the slot opposite said lug are spaced shoulders 94, 95 and 96 respectively. As will be observed, the shoulder 94 is disposed rearwardly of the lug 93, the shoulder 95 opposite the rear end of the lug and the shoulder 96 forwardly of said lug. Preferably, the end wall 89 bears the legend "R" adjacent the rear end of the slot, for indicating reverse, and the legend "N" adjacent the forward end of the slot for indicating neutral. Between these legends, the end wall 89 is also preferably provided with the numerals 1, 2 and 3, as shown in the drawings, for indicating the proper position of the control lever for low, second and high respectively.

Mounted to swing in the housing 76 is a lever 97 provided at its inner end with a hub 98 and formed on the ends of said hub are collars 99 one of which is, as best seen in Figure 21 of the drawings, journaled in the socket 81 of the housing while the other of said collars is journaled in the adjacent end of the sleeve 87, the latter collar being provided with diametric notches 100. Rotatably mounted in the sleeve 87 is a tubular shaft 101 and formed on said shaft are collars 102 journaled within the sleeve, the collar at the inner end of the shaft being provided, as best seen in Figures 19 and 21, with spaced lugs 103 which engage in the notches 100 of the collar at the adjacent end of the hub 98 of the lever 97. The shaft is thus detachably connected to said hub and securing the parts in assembled relation is a rod 104 which extends through the shaft and hub. At its outer end the rod is provided with a flange 105 which overlies the outer end of the shaft and formed on the inner end of the rod is a reduced threaded stud 106 which extends through the adjacent end of the block 77 of the housing 76 and through the adjacent end of the cap 78. Screwed on said stud is a nut 107. The rod 104 is thus utilized to cooperate with the stud 79 and nut 80 for clamping the housing upon the steering post 75 as well as securing the tubular shaft 101 and lever 97 in assembled relation. As will be seen, the construction is compact, while, at the same time, the parts may be readily assembled in operative position upon the steering post.

Integrally formed on the outer end of the shaft 101 is a depending yoke 108 which is provided at the upper side of the shaft with a slot 109 and pivoted between the free ends of said yoke is a control lever 110 more or less snugly accommodated by said slot, the lever being secured at its lower end by a pivot pin 111. The lever 110 extends freely through the slot 92 of the casing 88 and at its upper end is preferably provided with a handle 112. Slidable in a suitable socket in the outer end of the rod 104 to coact with the lever 110 is a plunger 113 and arranged behind said plunger is a spring 114 urging the plunger outwardly against the lever so that said plunger will normally hold the upper end portion of the lever against the outer side wall of the slot 92. In this connection, it should be observed that the upper end of the lever 110 is curved outwardly so that the handle 112 of said lever will be conveniently accessible to the fingers of the right hand of the driver of the vehicle. Accordingly, the lever may be operated without removing the hand from the steering wheel or removing the eyes from the road.

Formed on the rear end of the casing 10, as particularly shown in Figure 4, is a transversely extending sleeve 115 and slidable in said sleeve is a rack bar 116 which, as best seen in Figure 5, meshes with the gear 32 on the selector shaft 31. Screwed into the outer end of said sleeve is a tubular nut 117 and screwed into the lower end of the sleeve 82, as best shown in Figure 20, is a tubular nut 118. Fixed at its ends to these nuts is the sheath 119 of a flexible shaft 120. At its lower end, the shaft 120 is, as seen in Figure 4, fixed to the rack bar 116 and fixed to the upper end of said shaft, as shown in Figure 20, is a rod 121 which is slidable in the sleeve 82, the rod being received within the housing 76 by the channel 83 thereof. Formed in the rod near its upper end is a notch 122 and formed on the free end of the lever 97 to engage in said notch is a flattened terminal 123. The lever 97 is thus operatively connected to the flexible shaft 120 and, as will now be appreciated, when the lever 110 is rocked, the shaft 101 will be rotated for swinging the lever 97 and reciprocating the rack bar 116 to rotate the selector shaft 31 and set the selectors 33 and 34.

As will now be noted, when the lever 110 is moved to engage the shoulder 96 of the notch 92, the selectors are, as shown in Figures 3 and 4 of the drawings, set to select high speed and by swinging the lever rearwardly to engage the shoulder 95, the selectors may be set to select second speed. Thus, by rocking the lever back and forth, between the shoulders 95 and 96, the selectors may be set to alternately select second and high speeds, for city driving. The shoulder 96 will, however, provide a stop for the lever to prevent the lever, when swung forwardly, from being moved to the end of the slot 92, to select neutral. Upon reaching high speed position, it will be noted that the lever must be rocked inwardly on its pivot 111 against the action of the plunger 113 until the lever clears the shoulder 96, when the lever may then be swung forwardly to the end of the slot for selecting neutral. Similarly, the forward end of the lug 93 provides a stop shoulder for the lever when swung rearwardly from neutral. As will be noted, high speed will first be selected, when the lever will strike the forward end of the lug for limiting the lever in high speed position so that second speed will not be accidently selected immediately following neutral. After the lever strikes the forward end of the lug 93, it is then necessary to release the lever slightly so that the plunger 113 may rock the lever outwardly to clear the lug, when the rearward swinging movement of the lever may be continued. In like manner, the shoulder 95 will, when the lever is swung rearwardly from high speed position, provide a stop for the lever so that low speed will not be accidently selected immediately following high speed. After the lever engages the shoulder 95, it is then necessary to rock the lever inwardly, against the action of the plunger 113, to clear said shoulder, when the lever may then be swung further rearwardly to engage the shoulder 94 for selecting low speed. The shoulder 94 thus provides a stop for the lever so that reverse will not be accidently selected immediately following second speed. Assuming the lever to be in low speed position, it is necessary, as will be noted, to rock the lever inwardly against the action of the plunger 113 until said lever clears the shoulder 94, when the lever may then be rocked further rearwardly for selecting reverse. When the lever is in reverse position and is then swung forwardly, the lever will strike the rear end of the lug 93 which lug will thus provide a stop shoulder for the lever adapted to limit said lever in low speed position so that second speed will not be accidently selected immediately following reverse. Upon reaching low speed, the lever may then be released by the fingers, so that the plunger 113 may rock the lever outwardly to clear said lug, when the lever may then be swung forwardly to select either second or high, as previously described. Thus, as will be seen, the slot 92 is provided with shoulders such as will definitely limit the lever 110 when swung either forwardly or rearwardly so as to obviate confusion in selecting the speed desired or in neutralizing the mechanism.

Bolted to the rear end of the transmission case 13 of the vehicle, as particularly seen in Figure 16, is a bracket 124 provided at its free end with a yoke 125 and pivotally supported by said bracket is a power cylinder 126 closed at its end by heads 127. Formed on the forward head are ears 128 and extending through said ears are clamping rods 129 provided at their rear ends with hooks 130 engaging over the rear head so that by adjusting the nuts on the forward ends of said rods, both heads may be securely clamped in position. Screwed through the rear head axially thereof, as particularly seen in Figure 24, is an eye-bolt 131 which is received by the yoke 125 of the bracket 124 and extending through the eye of said bolt and the yoke is a pin 132 pivotally connecting the power cylinder with said bracket. As will be noted, the eye-bolt 131 carries a jam-nut 133. Reciprocable in the cylinder 126 is a piston 134 from which extends a piston rod 135 slidable through the forward head of the cylinder, the piston being, as seen in Figure 24, detachably mounted upon the rod. At its forward end, the rod carries a yoke 136 which is pivotally connected to the free end of the lever 66 by a pin 137 and extending between the yoke and the forward end of the cylinder is a flexible boot 138 housing the exposed portion of the piston rod. As will be observed, the piston rod 135 will, as shown in Figure 22, engage the eye-bolt 131 for limiting the piston in its rearward movement. Accordingly, the eye-bolt may be adjusted on the rear cylinder head for varying the throw of the piston to suit the throw of the operating lever 66 with relation to the position of the bracket 124 and, of course, the cylinder will rock on said bracket as the lever 66 is swung.

Closing the casing 10 at its upper side is a removable cover plate 139 and formed on said casing at the forward left corner thereof, as particularly seen in Figures 1, 3 and 4 of the drawings, is a seat 140. Detachably bolted to said seat is a cylindrical vertically disposed valve casing 141 and formed on said casing at its upper end, as particularly seen in Figure 10 of the drawings, is a housing 142 which overhangs the cover plate 139 to rest thereagainst. As will be noted, the bottom wall of the housing 142 is apertured to rotatably receive the upper end of the shaft 59 and closing said housing is a removable cover plate 143. Near its upper end, the valve casing 141 is stepped to provide a cylindrical chamber 144 which opens into the housing 142 and formed on the lower end portion of the casing, as particularly seen in Figure 11, are nipples 145, 146 and 147 which provide ports 148, 149 and 150 all disposed in the same horizontal plane. Formed in the valve casing in vertical alignment with the port 150 thereabove, as particularly seen in Figure 12, is an air intake port 151 and formed in the valve casing in vertical alignment with the port 149 thereabove is an air intake port 152, the ports 151 and 152 both lying in the same horizontal plane. Detachably connected to the nipple 145 is a suction pipe 153 in communication with the intake manifold of the vehicle engine so that engine suction will be communicated through said pipe to the port 148. Extending between the nipple 146 and the front end of the power cylinder 126 is a pipe 154 and extending between the nipple 147 and the rear end of the power cylinder is a pipe 155. The pipes 154 and 155 are, of course, sufficiently flexible to accommodate the oscillation of the power cylinder.

Slidably and rotatably fitted in the valve casing 141 is a valve rod 156 provided near its lower end with an annular groove 157 while at its upper end said rod is formed with a reduced terminal 158. Formed in the periphery of the valve rod at its forward side, as particularly seen in Figure 11, is a circumferentially extending passage 159 and formed in the periphery of the rod at opposite sides of said passage are longitudinally extending air passages 160 and 161 which open at their upper ends through the shoulder at the base of the terminal 158 and are of a length equal to the travel of the valve rod.

Tightly fitting within the chamber 144 of the valve casing is a fixed locking sleeve 162 shown in detail in Figure 15 of the drawings. As will be observed, this sleeve is formed at one side thereof with a more or less M-shaped slot having spaced parallel legs 163 and 164 extending longitudinally of the sleeve and depending between the upper ends of said legs is a tongue 165 the tip of which is V-shaped to provide diverging inclined edges sloping towards the legs of the slot.

Detachably connected to the terminal 158 of the valve rod is a crank 166 which, as seen in Figures 1, 3 and 4 of the drawings, is freely movable within the housing 142 and upstanding from the free end of said crank is a stud 167. Depending from the inner end of the crank is a sleeve 168 which slidably fits the terminal 158 of the valve rod and is rotatably received within the locking sleeve 162. Formed in the sleeve 168 of the crank from the lower end thereof are diametric slots 169 which extend longitudinally of the sleeve and extending through the terminal 158 of the valve rod near the upper end thereof is a diametrically disposed pin 170 which is freely accommodated by said slots. Thus, the pin serves to connect the crank 166 with the valve rod 156 so that when the crank is rocked, the valve rod will be rotated thereby while, however, the valve rod may reciprocate within the valve casing 141 independently of the crank, the pin 170 sliding within the slots 169 of the sleeve 168 when the valve rod is thus reciprocated. As will be observed, the rear end of the pin is received within the M-slot in the locking sleeve 162 to coact with said sleeve and confronts the wall of the chamber 144 while the forward end of said pin confronts the inner circumference of the sleeve so that the pin is thus limited against endwise displacement.

Pivoted at their inner ends upon the upper end of the shaft 59, eccentrically thereof, is a pair of companion reversing levers 171 and 172, which are freely accommodated within the housing 142 and, as seen in Figures 1, 3 and 4 of the drawings, are curved inwardly at their free ends to coact with the stud 167 of the crank 166. As shown in Figure 10, the levers are provided at their inner ends with mating superposed leaves through which extends a cap screw 173 pivotally connecting the levers with the shaft 59 and extending transversely between the levers approximately midway between the ends thereof is a connecting spring 174. Fixed to the shaft 59 forwardly of the cap screw 173 is a pin 175 which upstands from the shaft eccentrically thereof between the inner end portions of the levers.

When the valve rod 156 is in normal closed position at the end of its downward throw, the passage 159 in said rod is disposed below the port 148 of the valve casing 141 so that the valve is thus closed to engine suction through the pipe 153 and in the rotative position of the valve rod shown in Figures 1, 3, 4 and 10–14 inclusive of the drawings, when the piston 134 is at the end of its rearward stroke, the passage 160 of the valve rod is disposed to register with the port 150 of the valve casing, it being recalled in this connection that the passages 160 and 161 of the rod are of a length equal to the travel of said rod. Accordingly, air is admitted through the port 151 of the valve casing, through the passage 160 of the valve rod and through the pipe 155 to the rear end of the power cylinder 126 for relieving any pressure behind the piston.

Assuming now that in the indicated rotative position of the valve rod, said rod is raised to the position shown in Figures 10 and 11 of the drawings. As will be seen, the pin 170 of the valve rod will first enter the upper end of the leg 163 of the M-slot in the locking sleeve 162 behind the tongue 165 when the passage 159 in said rod will move into register with the ports 148 and 149 of the valve casing. Engine suction will thus be admitted through the pipe 153, the port 148, the passage 159, the port 149 and pipe 154 to the forward end of the power cylinder 126. The piston 134 will thus be moved forwardly for swinging the operating lever 66. Figure 23 of the drawings shows the position of the piston when the lever 66 has traveled forwardly approximately half of its throw and the levers 60 and 61 have been swung inwardly to the position shown in Figure 3 for neutralizing any previously active speed, as previously described. As the piston 134 then travels onward to the end of its forward throw, as shown in Figure 24 of the drawings, the lever 66 will, as shown in Figure 4, be swung forwardly to the end of its throw for swinging the levers 60 and 61 apart and rendering any selected speed active, as also previously described.

Attention is now directed to the fact that when the lever 66 is thus swung forwardly by the piston 134, the pin 175 on the upper end of the shaft 59 will be swung by said shaft against the lever 172 for spreading this lever away from the lever 171 and, as shown in Figure 4, consequently tensioning the spring 174. The lever 171 will thus be urged by said spring to coact with the stud 167 on the crank 166 for rotating the valve rod 156 in a counter-clockwise direction. As long as the valve rod remains elevated, however, to maintain the passage 159 in communication with the ports 148 and 149 of the valve casing, the pin 170 will coact with the tongue 165 of the locking sleeve 162 for locking the valve against rotative movement. Upon the lowering of the valve rod 156, however, and after the passage 159 therein has moved downwardly out of communication with the ports 148 and 149, the pin 170 will clear the tongue 165 of the locking sleeve when, as will be seen, the lever 171 will, under the tension of the spring 174, swing the crank 166 and thus rotatably set the valve rod automatically in a position reverse to that shown in Figures 10-14 inclusive of the drawings, when the passage 160 of the valve rod will be out of communication with the ports 150 and 151 of the valve casing while the passage 161 of the valve rod will be in communication with the ports 149 and 152 of the valve casing. Thus, as the valve rod 156 comes to rest at the end of its downward movement, admission of air to the rear end of the power cylinder 126 will be cut off while air will be admitted to the front end of said cylinder through the port 152 of the valve casing, the passage 161 of the valve rod, the port 159 and pipe 154 for relieving any pressure in front of the piston 134.

It will now be assumed that the piston 134 is at the end of its forward stroke and that the valve rod 159 has been rotatably set in a position reverse to that illustrated in Figures 10-14 inclusive of the drawings, as just previously described, in which position of the parts the valve rod 156 is again lifted. As will be seen, the pin 170 of the valve rod will first move into the leg 164 of the M-slot in the locking sleeve 162 behind the tongue 165 when the passage 159 in the valve rod will move into communication with the ports 148 and 150 of the valve casing. Engine suction will thus be admitted through the pipe 153, the port 148, the passage 159, the port 150 and the pipe 155 to the rear end of the power cylinder 126 for moving the piston rearwardly. The lever 66 will consequently be swung rearwardly to the end of its rearward throw for first neutralizing any previously active speed and then rendering a selected speed active, as previously described. As the lever 66 is swung rearwardly, the pin 175 will, as the shaft 59 is rotated, be swung against the lever 171 so that the lever 172 will be permitted to coact with the stud 167 of the crank 166 while the lever 171 will be spread away from the lever 172 for tensioning the spring 174. Consequently, as the valve 156 is then lowered to normal position, the passage 159 in the valve rod will first move out of communication with the ports 148 and 150 of the valve casing for cutting off engine suction to the rear end of the power cylinder when as the pin 170 clears the lower end of the tongue 165 of the locking sleeve 162, the lever 172 will, under the tension of the spring 174, coact with the stud 167 for swinging the crank 166 in a clockwise direction and thus rotatably setting the valve rod 156 in a position reverse to that assumed or, in other words, in the position shown in Figures 10-14 inclusive of the drawings.

It will accordingly be seen, in view of the foregoing, that as the valve rod 156 is lifted to open position, to effect the actuation of the power piston, said rod will, before reaching open position, be locked against rotative movement when, after the valve reaches open position and the power piston is shifted, the spring 174 will be tensioned to cause either one or the other of the levers 171 and 172, as the case may be, to coact with the crank pin 167 for rotatably setting the valve rod automatically as said rod is subsequently lowered to normal position whereby to effect reverse travel of the power piston when next actuated. Reversal of the travel of the power piston is thus accomplished automatically and in this connection, it will be noted that when the valve rod is rotatably set, air is immediately admitted to one end of the power cylinder or the other, as the case may be, for relieving any pressure either in front of the piston or behind the piston, depending upon the direction in which the piston will next be moved, so that the piston may travel freely within the power cylinder.

Attention is now directed to the fact that even though the spring 174, acting on either one or the other of the levers 171 and 172, should fail to swing the crank 166 throughout its entire travel, the inclined end edges of the tongue 165 of the locking sleeve 162 will coact with the pin 170 for mechanically rotating the valve in either one direction or the other selectively, as the valve is lifted, so that the valve will, when the power piston is actuated, always be rotatably set to cause reverse travel of the piston when next actuated. Furthermore, it is also to be noted that as the movement of the power piston causes the rotative setting of the valve rod, it is impossible for the rod to become improperly set with respect to the position of the piston. Should the piston stop, for any reason, before completing either its forward or rearward stroke, the rotative setting of the valve rod will remain unaffected because the valve rod is locked by the pin 170 against rotation when said rod is in raised open position. The valve rod will accordingly remain in correct set position to admit engine suction to the proper end of the power cylinder until the piston has completed its stroke in either one direction or the other, as the case may be. Thus, provision is made whereby improper functioning of the valve to control the movement of the piston will be avoided. Should insufficient tension be built up in the spring 174 to rotate the valve rod after the piston has stopped and the valve rod is lowered, the pin 170 will, when the valve rod is next raised, enter the same leg of the M-slot as it had just previously entered so that the movement of the piston will be completed in the same direction in which it had started to travel. Assuming, however, that sufficient tension has been built up in the spring 174 to rotate the valve rod after the piston has stopped and the valve rod is lowered, the rotative setting of the valve rod will be reversed so that the piston will, when the valve rod is next raised be returned to its initial position. In any event, the inclined edges of the tongue 165 of the sleeve 162 will prevent the valve rod from being rotatively set in a position such that, when the valve rod is lifted to open position, engine suction will fail to move the piston in either one direction or the other and in this connection it is to be noted that, after the piston reaches a middle position in the power cylinder, it is immaterial, should the piston then stop, in which direction the piston is next moved as movement of the piston in either one direction or the other will then serve to render active the speed selected.

The usual clutch pedal shaft of the vehicle is indicated at 176 and fixed to said shaft is a rearwardly extending lever 177. At its rear end, this lever is, as particularly seen in Figure 10, provided with a yoke 178 which straddles the valve rod 156 and fixed in the sides of said yoke are trunnions 179 which freely engage in the groove 157 of the rod. Thus, the valve rod may be freely turned independently of the lever 177 while, however, when the lever is swung, the valve rod will be reciprocated thereby.

As will now be seen in view of the foregoing description, the control lever 110 may be manually set to select any speed desired or neutral, when, upon the actuation of the clutch pedal of the vehicle, the lever 177 will be swung upwardly for lifting the valve rod 156 to open position, when the mechanism will be automatically actuated for rendering active the speed selected or neutralizing the mechanism as the case may be. In this connection, it should be observed that approximately the first half of the forward travel of the clutch pedal is utilized to disengage the vehicle clutch so that the clutch pedal may be freely operated to disengage the clutch without causing the actuation of the present mechanism. At the end of the first half of the forward travel of the clutch pedal, the pin 170 of the valve rod 156 is elevated to a position near the lower end of the tongue 165 of the locking sleeve 162. Approximately the second half of the forward travel of the clutch pedal is utilized to shift the valve rod 156 to open position. Thus, after the vehicle clutch has been disengaged, further forward movement of the clutch pedal will serve to cause the actuation of the present mechanism. At no time, however, will the pin 170 of the valve rod strike the upper end wall of either of the slots 163 and 164 of the locking sleeve so that the clutch pedal may be pressed forwardly to its full limit without likelihood of shearing said pin, the valve rod 156 thus always floating free.

Having thus described the invention, I claim:

1. Transmission control mechanism including shifting means for rendering a selected speed active, means including an oscillating element operable upon either throw thereof for actuating said shifting means, reciprocable power operated means for actuating said element, and means including means controlled by the movement of said power-operated means for reversing the travel of said power operated means automatically.

2. Transmission control mechanism including shifting means for neutralizing a previously active speed and rendering a selected speed active, means including an oscillating element operable upon either throw thereof for actuating said shifting means to thereby neutralize a previously active speed and render a selected speed active, reciprocable power operated means for actuating said element, and means controlled by the movement of said power-operated means for reversing the travel of said power operated means automatically.

3. Transmission control mechanism including selecting means, shifting means operable by said selecting means for neutralizing a previously active speed and rendering a selected speed active, means including an oscillating element operable upon either throw thereof for actuating said selecting means, reciprocable power operated means for actuating said element, and means for reversing the travel of said power operated means automatically, said last named means being controlled by the movement of said power-operated means.

4. Transmission control mechanism including selecting means, shifting means operable by said selecting means for neutralizing a previously active speed and rendering a selected speed active, means for setting the selecting means to select a future speed while said selected speed is active, means including an oscillating element operable upon either throw thereof for actuating said selecting means, reciprocable power operated means for actuating said element, and means for reversing the travel of said power operated means automatically.

5. Transmission control mechanism including shifting means movable in one direction for neutralizing a previously active speed and in the opposite direction for rendering a selected speed active, means including an oscillating element operable upon either throw thereof for imparting a two-way movement to said shifting means, reciprocable power operated means for actuating said element, and means for reversing the travel of said power operated means automatically.

6. Transmission control mechanism including selecting means, shifting means movable in one direction by said selecting means for neutralizing a previously active speed and in the opposite direction for rendering a selected speed active, means including an oscillating element operable upon either throw thereof for imparting a two-way movement to said selecting means, reciprocable power operated means for actuating said element, and means for reversing the travel of said power operated means automatically.

7. Transmission control mechanism including selecting means, shifting means movable by said selecting means in one direction for neutralizing any one of a number of speeds and in the opposite direction for rendering active any selected one of said number of speeds, the selecting means being rotatable, means for rotatably setting said selecting means to select any one of said number of speeds while said selected speed is active, means including an oscillating element operable upon either throw thereof for actuating said selecting means, reciprocable power operated means for actuating said element, and means for reversing the travel of said power operated means automatically.

8. Transmission control mechanism including shifting means movable in one direction for neutralizing a previously active speed and in the opposite direction for rendering a selected speed active, means including companion levers for actuating said shifting means, an operating lever, a toggle for converting each one-way movement of said operating lever into a two-way movement of said first-mentioned levers, reciprocable power operated means for actuating said operating lever, and means for reversing the travel of said power operated means automatically.

9. Transmission control mechanism including companion selectors, gear shifters movable by said selectors in one direction for neutralizing a previously active speed and in the opposite direction for rendering a selected speed active, means including companion levers for shifting said selectors, an operating lever, a toggle for converting each one-way throw of said operating lever into a two-way movement of said first-mentioned levers, reciprocable power operated means for actuating said operating lever, and means for reversing the travel of said power operated means automatically.

10. Transmission control mechanism including shifting means for rendering a selected speed active, means including an oscillating element operable upon either throw thereof for actuating said shifting means, reciprocable power operated means for actuating said element, means controlling the actuation of said power operated means, and means governed by the power-operated means during its movement in one direction for automatically setting said control means to reverse the travel of said power operated means.

11. Transmission control mechanism including shifting means for rendering a selected speed active, means including an oscillating lever operable upon either throw thereof for actuating said shifting means, reciprocable power operated means for actuating said lever, means controlling the actuation of said power operated means, and means energized by the movement of said power operated means for automatically setting said control means to reverse the travel of said power operated means when next actuated.

12. Transmission control mechanism including shifting means for rendering a selected speed active, means including an oscillating element operable upon either throw thereof for actuating said shifting means, reciprocable power operated means for actuating said element, means governed by the power means during its movement in one direction for causing the said power means to move in the opposite direction, and manually-operated means controlling said last named means.

13. Transmission control mechanism including shifting means for rendering a selected speed active, means including an oscillating element operable upon either throw thereof for actuating said shifting means, reciprocable power operated means for actuating said element, means reciprocable for controlling the actuation of said power operated means, said control means being rotatable, and means for rotatably setting said control means to reverse the travel of said power operated means automatically.

14. Transmission control mechanism including shifting means for rendering a selected speed active, means including an oscillating element operable upon either throw thereof for actuating said shifting means, reciprocable power operated means for actuating said element, means reciprocable to control the actuation of said power operated means, said control means being rotatable, and means energized by the movement of said power operated means for rotatably setting said control means to reverse the travel of said power operated means automatically when next actuated.

15. Transmission control mechanism including shifting means for rendering a selected speed active, means including an oscillating element operable upon either throw thereof for actuating said shifting means, reciprocable power operated means for actuating said element, a valve member reciprocable to control the actuation of said power operated means, said member being rotatable, and means for rotatably setting said member to reverse the travel of said power operated means automatically.

16. Transmission control mechanism including shifting means for rendering a selected speed active, means including an oscillating element operable upon either throw thereof for actuating said shifting means, reciprocable power operated means for actuating said element, a valve member reciprocable to control the actuation of said power operated means, said member being rotatable, and means energized by the movement of said power operated means for rotatably setting said member automatically to reverse the travel of said power operated means when next actuated.

17. Transmission control mechanism including shifting means for rendering a selected speed active, means including an oscillating element operable upon either throw thereof for actuating said shifting means, reciprocable power operated means for actuating said element, a reciprocable valve member axially movable in one direction to open position to effect the actuation of said power operated means and axially movable in the opposite direction to closed position, said valve member being rotatable, means for locking said member against rotation as said member is shifted towards open position, and means for rotatably setting said member automatically when closed to reverse the travel of said power operated means when said member is next shifted to open position.

18. In a control mechanism for a change speed transmission having shiftable means movable to two different positions for causing a speed ratio to be either active or neutral, means including an oscillating element for moving said shiftable means to its two different positions, power-operated means for oscillating said element, control means for reversing the movement of said power means, and means governed by the power means during its movement in one direction for moving said control means to a position where the power means will be moved in the opposite direction.

19. In a control mechanism for a change speed transmission having shiftable means movable to two different positions for causing a speed ratio to be either active or neutral, means including an oscillating element for moving said shiftable means to its two different positions, power-operated means for oscillating said element, control means for reversing the movement of said power means, means governed by the power means during its movement in one direction for moving said control means to a position where the power means will be moved in the opposite direction, and manual means for causing the control means for the power means to be either operable or inoperable.

20. In a control mechanism for a change speed transmission having shiftable means movable to two different positions for causing a speed ratio to be either active or neutral, means including an oscillating element for moving said shiftable means to its two different positions, fluid-operated power means for oscillating said element, means including a reversing valve for controlling the power to the power means to cause said power means to move in opposite directions, and means actuated by the power means during its movement in one direction for moving said valve to a position to cause the power means to be moved in the opposite direction.

21. In a control mechanism for a change speed transmission having shiftable means movable to two different positions for causing a speed ratio to be either active of neutral, means including an oscillating element for moving said shiftable means to its two different positions, fluid-operated power means for oscillating said element, means including a reversing valve for controlling the power to the power means to cause said power means to move in opposite directions, means actuated by the power means during its movement in one direction for moving said valve to a position to cause the power means to be moved in the opposite direction, and manually-actuated means for disconnecting said fluid power means from its source of power.

GLENN T. RANDOL.